United States Patent
Sutton

(10) Patent No.: US 8,902,799 B2
(45) Date of Patent: Dec. 2, 2014

(54) POWER REDUCTION WITH MULTIPLE RECEIVE PATHS

(75) Inventor: Todd R. Sutton, Del Mar, CA (US)

(73) Assignee: Wi-LAN, Inc., Ottawa, Ontario (CA)

( * ) Notice: Subject to any disclaimer, the term of this patent is extended or adjusted under 35 U.S.C. 154(b) by 1981 days.

(21) Appl. No.: 12/015,431

(22) Filed: Jan. 16, 2008

(65) Prior Publication Data

US 2009/0180413 A1 Jul. 16, 2009

(51) Int. Cl.
| G08C 17/00 | (2006.01) |
| H04W 52/02 | (2009.01) |
| H04L 27/00 | (2006.01) |
| H04B 7/08 | (2006.01) |

(52) U.S. Cl.
CPC ....... *H04L 27/0012* (2013.01); *H04W 52/0225* (2013.01); *H04B 7/08* (2013.01); *Y02B 60/50* (2013.01)
USPC ........ 370/311; 370/334; 455/135; 455/277.2; 375/347

(58) Field of Classification Search
None
See application file for complete search history.

(56) References Cited

U.S. PATENT DOCUMENTS

| 6,678,508 | B1 | 1/2004 | Koilpillai et al. | |
| 7,769,402 | B2 * | 8/2010 | Cai et al. | 455/517 |
| 7,873,044 | B2 * | 1/2011 | Kang et al. | 370/390 |
| 2004/0219959 | A1 | 11/2004 | Khayrallah et al. | |
| 2005/0197080 | A1 * | 9/2005 | Ulupinar et al. | 455/135 |
| 2007/0064839 | A1 | 3/2007 | Luu | |
| 2008/0259878 | A1 * | 10/2008 | Connors et al. | 370/336 |
| 2008/0259879 | A1 * | 10/2008 | Connors et al. | 370/336 |
| 2009/0060086 | A1 * | 3/2009 | Kimmich et al. | 375/295 |

FOREIGN PATENT DOCUMENTS

| JP | 2005/260482 A | 9/2005 |
| KR | 10-2006-0022506 A | 3/2006 |
| WO | WO 2005/084379 | 9/2005 |
| WO | WO 2007/025038 | 3/2007 |

* cited by examiner

*Primary Examiner* — Jae Y Lee
*Assistant Examiner* — Tito Pham
(74) *Attorney, Agent, or Firm* — Volpe and Koenig, P.C.

(57) ABSTRACT

Methods and apparatus for power reduction in a wireless device having multiple receive paths are described herein. A wireless device configured for any one of multiple operating modes may utilize multiple receive signal paths to improve the receive signal quality in each of the operating modes. The wireless device may be configured to dynamically reconfigure a modulation coding scheme to compensate for varying signal qualities in some modes. The wireless receiver may be configured in other operating modes where the modulation coding scheme is fixed for a duration of the operating mode. The wireless device can conserve power when it is operating in a mode supporting a constant modulation coding scheme. The wireless device can determine a signal metric value of the received signals and can selectively power down or deactivate a receive signal path based on the value of the signal metric.

26 Claims, 6 Drawing Sheets

POWER REDUCTION WITH MULTIPLE RECEIVE PATHS

BACKGROUND

I. Field of the Invention

The present disclosure relates to power reduction in wireless communication devices. In particular, the present disclosure relates to power reduction in multiple receiver wireless communication devices.

II. Related Art

Portable wireless communication devices typically are designed to operate in widely varying operating conditions using battery power. The change in operating conditions may be due to changes in the external environment in which the wireless communication system operates. For example, the operating environment may range from a climate controlled indoor environment to high and low temperature extremes in an outdoor environment.

A wireless communication device typically experiences a wide range of electrical operating conditions. For example, the wireless communication device may experience wide fluctuations in channel conditions as a result of physical movement or re-orientation of the wireless communication device. The wireless communication device may experience fast channel fades across some or all of the operating frequencies due to destructive signal combination from multiple signal paths. Additionally, the wireless communication devices may experience slow channel fades that may occur as a result of changes in geographic location. For example, the received signal strength at a wireless communication device typically decreases as the distance to the source increases. Moreover, changes in the terrain surrounding the wireless communication device that occur as a result of movement can contribute to or remove occlusions that attenuate signals directed to the wireless communication device.

A wireless communication device can implement multiple receivers, for example, arranged as diversity receivers to improve performance of the wireless communication device over the wide range of operating conditions. The use of diversity receivers can improve the received signal quality where one or more of the receivers receive a weak signal. For example, where the antennas for the diversity receivers have spatial diversity, one antenna may receive a signal that experiences a strong signal fade while the other antenna can receive a signal that does not experience a substantial fade.

Although the use of diversity receivers may improve signal quality across the range of operating conditions, the multiple receivers consume greater power than is typically consumed by a single receiver path. Power consumption is typically of great concern in a portable device. The power consumed by the wireless communication device directly relates to its battery life. Users of wireless communication devices typically desire to extend the operating time between successive battery charges. Therefore, the desire to operate across a wide range of operating conditions, including marginal operating conditions, operates in contrast to the desire to conserve battery power during operating conditions.

BRIEF SUMMARY

Methods and apparatus for power reduction in a wireless receiver having multiple receive paths are described herein. A wireless receiver configured for any one of multiple operating modes may utilize multiple receive signal paths to improve the receive signal quality in each of the operating modes. The wireless receiver may be configured to dynamically reconfigure a modulation coding scheme to compensate for varying signal quality in some modes. The wireless receiver may be configured in other operating modes where the modulation coding scheme is fixed for an entire duration of the operating mode. The wireless receiver can conserve power during periods in which it is operating in a mode having constant modulation coding. The wireless receiver can determine a received signal metric and can selectively power down or otherwise deactivate a receive signal path based on the value of the signal metric.

Aspects of the present disclosure include a method of power reduction in a multiple receiver wireless communication device. The method includes receiving a wireless signal through multiple receivers of the wireless communication device, wherein the wireless communication device can be dynamically reconfigured to support any one of a plurality of modulation coding schemes, determining whether an engaged operating mode of the wireless communication device is configured to support a fixed modulation coding scheme for at least a portion of the wireless signal, determining a signal metric value based in part on the wireless signal, and selectively deactivating at least a portion of one of the multiple receivers based on the signal metric value and the fixed modulation coding scheme.

Aspects of the present disclosure include a method of power reduction in a multiple receiver wireless communication device. The method includes receiving a wireless signal containing a downlink subframe, the downlink subframe comprising a downlink map utilizing a first modulation coding scheme, determining from the downlink map that the downlink subframe includes a macro diversity region utilizing a second modulation and coding scheme, configuring the wireless communication device for the second modulation and coding scheme, receiving the macro diversity region of the of the downlink subframe, determining a signal metric value based in part on the macro diversity region, and selectively deactivating at least a portion of the multiple receiver wireless device based in part on the signal metric value.

Aspects of the present disclosure include a method of power reduction in a multiple receiver wireless communication device. The method includes receiving a downlink subframe of Orthogonal Frequency Division Multiple Access (OFDMA) symbols, determining, from a downlink map portion of the downlink subframe using a first modulation coding scheme, a logical channel resource allocation, configuring the multiple receiver wireless communication device for a second modulation coding scheme associated with the logical channel, receiving OFDMA symbols carrying the logical channel, determining a signal metric value based in part on the logical channel, and selectively deactivating at least a portion of one of the multiple receivers based in part on the signal metric value.

Aspects of the present disclosure include a multiple receiver wireless communication device having power consumption control. The multiple receiver wireless communication device includes a first receiver configured to receive a wireless signal having any of a plurality of modulation coding schemes, a second receiver configured to receive the wireless signal, and a power consumption control module configured to determine whether the device is engaged in an operating mode configured to support a fixed modulation coding scheme, and selectively deactivate the second receiver based in part on a signal metric value determined from the wireless signal.

Aspects of the present disclosure include a multiple receiver wireless communication device having power consumption control. The multiple receiver wireless communication device includes a first receiver configured to receive a wireless signal containing a downlink subframe, the downlink subframe comprising a downlink map utilizing a first modulation coding scheme, a second receiver configured to receive the wireless signal, a mode processor configured to determine from the downlink map that the downlink subframe includes a macro diversity region utilizing a distinct second modulation and coding scheme and configure the wireless communication device for the second modulation and coding scheme, the first and second receivers receiving the macro diversity region of the of the downlink subframe, a metric processor configured to determine a signal metric value based in part on the macro diversity region, and a comparator configured to selectively deactivate at least a portion of the multiple receiver wireless device based on the signal metric value.

Aspects of the present disclosure include a processor-readable medium comprising instructions, which, when executed by a processor, cause the processor to perform operations. The instructions include instructions for determining whether a multiple receiver wireless communication device is engaged in an operating mode that supports a fixed modulation coding scheme of a wireless signal, wherein the wireless communication device can be dynamically reconfigured to support any one of a plurality of modulation coding schemes, instructions for determining a signal metric value based in part on a portion of the wireless signal received by the multiple receiver wireless device, and instructions for selectively deactivating at least a portion of one of the multiple receivers based in part on the signal metric value and the fixed modulation coding scheme.

Aspects of the present disclosure include a multiple receiver wireless communication device having power consumption control. The multiple receiver wireless communication device includes receiving a wireless signal through at least one of multiple receivers of the wireless communication device, the wireless signals including first signals supporting dynamic modulation coding schemes and second signals supporting fixed modulation coding schemes, determining a selected signal comprises the second signals, determining a signal metric value based in part on the wireless signal, and selectively deactivating at least a portion of one of the multiple receivers based on the signal metric value and the fixed modulation coding scheme.

BRIEF DESCRIPTION OF THE DRAWINGS

The features, objects, and advantages of embodiments of the disclosure will become more apparent from the detailed description set forth below when taken in conjunction with the drawings, in which like elements bear like reference numerals.

DETAILED DESCRIPTION OF EMBODIMENTS OF THE INVENTION

Methods and apparatus for power reduction in a wireless communication device having multiple receive paths are described herein. In one embodiment, the wireless communication device determines whether the device is engaged in an operating mode that permits dynamic scheduling of modulation coding schemes or supports a fixed modulation coding scheme for signals received throughout the duration of the operating mode.

If the device is engaged in one of those operating modes supporting a fixed modulation coding scheme for signals received in the duration of the operating mode, the wireless communication device can further determine which fixed modulation coding scheme is utilized, and based in part on the modulation coding scheme, determine a signal metric type and a threshold value corresponding to the metric type from a signal metric look-up table. The wireless communication device can be configured to receive the wireless signals using multiple receivers or receive signal paths, and determine at least a signal metric value for the received signals.

The wireless communication device can also be configured to compare the signal metric value of the received signals against the threshold and can selectively energize or de-energize one or more receivers or receive signal paths within the wireless communication device based on the comparison. As an example, the wireless communication device may determine the received signal strength indication (RSSI) as the desired signal metric type and thus identify a RSSI threshold from the signal metric look-up table. When a RSSI value is determined from the received signals, the wireless communication device may de-energize one or more receivers in a diversity receiver if the RSSI value exceeds the threshold. Conversely, the wireless communication device may ensure that the multiple receivers of a diversity receiver are energized if the RSSI value does not exceed the threshold.

Figure 1:
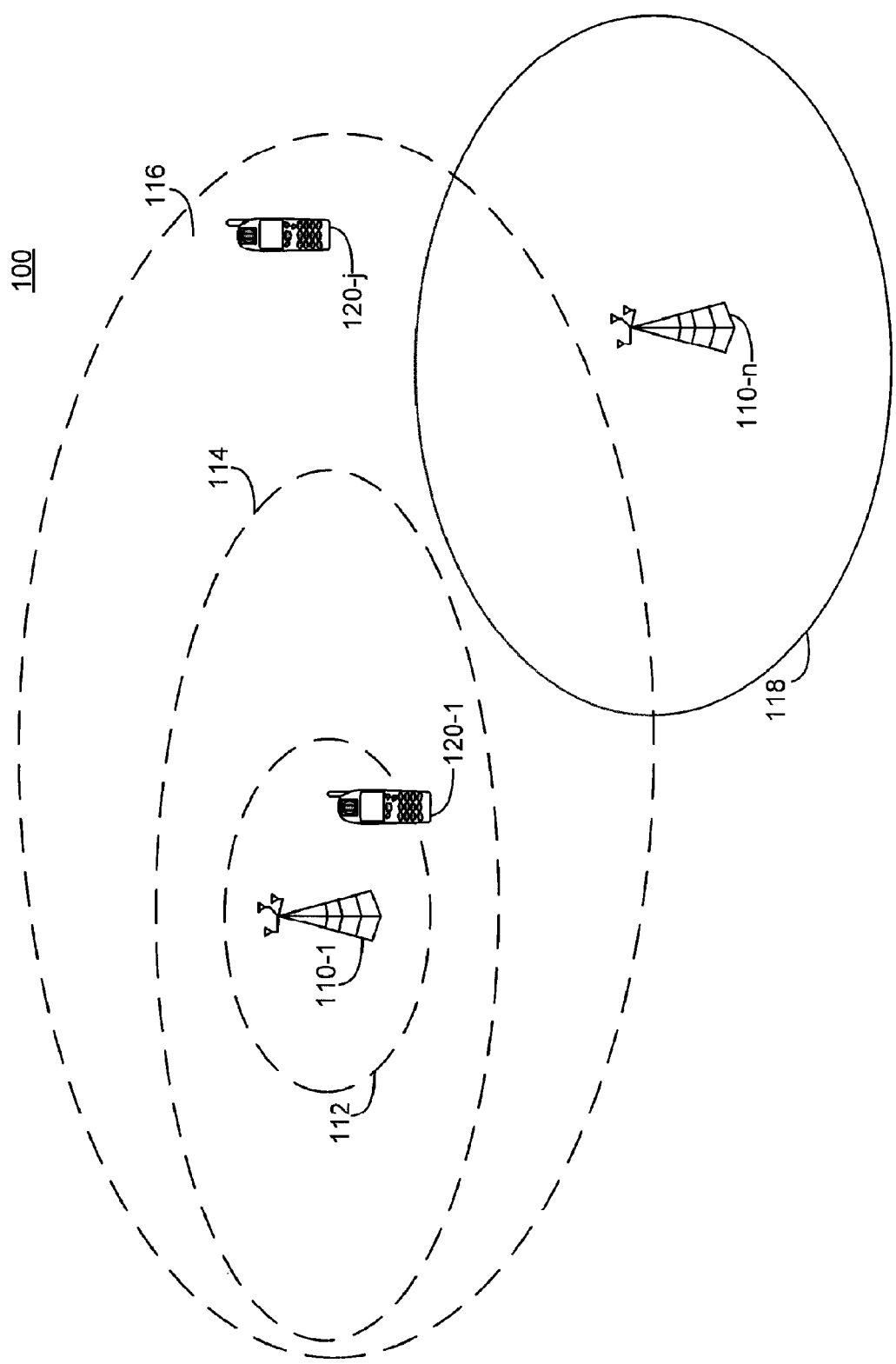
FIG. 1 is a simplified functional block diagram of an embodiment of a wireless communication system.

FIG. 1 is a simplified functional block diagram of an embodiment of a wireless communication system 100. The wireless communication system 100 includes multiple base stations, e.g., base stations 110-1 and 110-n, which are arranged to support wireless communications with multiple wireless communication devices, e.g., wireless communication devices 120-1 and 120-j.

Although FIG. 1 illustrates only two base stations 110-1 and 110-n, a wireless communication system 100 typically implements numerous base stations to support a predetermined geographic area. The number of base stations 110-1 and 110-n illustrated in FIG. 1 is limited for the sake of clarity.

Similarly, FIG. 1 illustrates only two distinct wireless communication devices 120-1 and 120-j, but a typical wireless communication system 100 can support a vast number of wireless communication devices and is not limited by the example described in relation to FIG. 1. In practice, a wireless communication device can be a wireless-enabled portable computer, a wireless telephone, and the like, or some other wireless device or device in combination with a wireless modem. A wireless communication device can also be referred to as a client station, a subscriber station, a mobile device, a mobile unit, a mobile station, a user terminal, or any other similar or equivalent component regardless of a different terminology.

Each base station provides communication support over a predefined geographic area, often referred to as a coverage area. For example, in FIG. 1 a first base station 110-1 supports a coverage area 116, and an adjacent base station, namely, a second base station 110-n, supports a corresponding coverage area 118. The coverage areas 116 and 118 are depicted as being substantially circular for the sake of convenience. In operation, a coverage area may have virtually any shape, and the shape need not be symmetrical due to obstructions, terrain, and other factors that may affect wireless signals within the coverage area. As seen in FIG. 1, the coverage area 118 of the second base station 110-n may partially overlap the coverage area 116 of the first base station 110-n. A wireless communication device in the overlapping coverage area (not shown) may communicate with either one of or both base stations 110-1 and 110-n.

A wireless communication device, such as a first wireless device 120-1 or a second wireless device 120-j, can be configured to be engaged in or otherwise operate in any one of multiple operating modes. For example, the wireless communication device can be configured to operate in a receive-only mode, where the device does not have any ability to transmit an uplink signal to the base stations. Typically, while operating in receive only mode, a wireless communication device is configured to receive unidirectional signals and content, such as music or multimedia programming. As an additional example, the wireless communication device can be configured to operate in a broadcast mode, where the device receives a signal that a base station broadcasts to all users within its coverage area. Unlike the receive-only mode, the broadcast mode may permit some level of uplink information from the device, such as used to support interactive programming. In another example, the wireless communication device can be configured to operate in a multi-cast mode, where the device is one of a group of devices for which content is directed. In yet another embodiment, the wireless communication device can be configured to operate in a full duplex communication mode and may communicate in a point to point link with another device, such as in a telephone link. The engaged operating mode can be used by the wireless communication device to determine whether the first wireless communication device is operating using a fixed modulation coding scheme or a dynamically varying modulation coding scheme.

A wireless communication device, such as the first wireless device 120-1 or second device 120-j, can be further configured to determine whether an operating mode that the device is engaged in or otherwise operates under allows a fixed modulation coding scheme or dynamically varying modulation coding schemes. As will be described in detail below, when a device is engaged in a mode that permits dynamically varying modulation coding schemes, the device can implement several power control mechanisms, which may not be available when the device operates under a mode supporting a fixed modulation coding scheme.

For example, the first wireless communication device 120-1 operating in a mode using a dynamically varying modulation coding scheme may control or otherwise adjust the received power from the first base station 110-1 using a power control feedback loop with the first base station 110-1. Specifically, when the first wireless communication device 120-1 is in a first region 112 of the coverage area 116, which typically is a region nearest the first base station 110-1, the wireless communication device 120-1 can receive a high signal power that typically correlates with high signal quality that is more than sufficient for a particular application.

The first wireless communication device 120-1 can use a power control feedback loop to request that the first base station 110-1 reduce a transmit power of a signal directed to the first wireless communication device 120-1 to a level that is sufficient to maintain a desired signal quality. But if the first wireless communication device 120-1 moves to a second region 114 of the coverage area 116, the transmit power from the first base station 110-1 that was sufficient in the first region 112 may no longer be sufficient to maintain the signal quality. In that case, the first wireless communication device 120-1 can use the power control feedback loop to request that the first base station 110-1 increase its transmit power to the first wireless communication device 120-1 to maintain the desired signal quality. Similarly, if the first wireless communication device 120-1 moves to an outer region of the coverage area 116, the transmit power from the first base station 110-1 that was sufficient in the first region 112 or the second region 114 may be insufficient to maintain the desired signal quality. The first wireless communication device 120-1 can use the power control feedback loop to request that the first base station 110-1 increase its transmit power to the first wireless communication device 120-1 to maintain the desired signal quality. Of course, the power control feedback techniques employed by the first wireless communication device 120-1 are not limited to any particular number of regions, and may occur in substantially a continuous manner. The first wireless communication device 120-1 may request that the first base station 110-1 increase its transmit power when a signal quality falls beneath a desired signal quality and may request that the first base station 110-1 decrease its transmit power when the signal quality is greater than the desired signal quality.

Additionally or alternatively, the first wireless communication device 120-1 operating in a mode using a dynamically varying modulation coding scheme may control or otherwise adjust an active modulation coding scheme to maintain a signal quality associated with the signals received from the first base station 110-1. For example, the first wireless communication device 120-1 may negotiate a first modulation coding scheme with the first base station 110-1 when the signal quality is high, such as in the first region 112. The first modulation coding scheme can be configured to support a high data rate with relatively little coding gain, modulation gain, or other type of redundancy used to improve signal quality. Similarly, the first wireless communication device 120-1 may negotiate a second modulation coding scheme with the first base station 110-1 when the signal quality is at an intermediate level, such as in the second region 114. The first wireless communication device 120-1 may likewise negotiate a third modulation coding scheme with the first base station 110-1 when the signal quality is at a low level, such as in the outer region of the coverage area 116. Of course, the wireless communication device 120-1 is not limited to implementing a dynamic modulation coding scheme process that is limited to three modulation coding schemes. The wireless communication device 120-1 may also implement dynamic modulation coding schemes in combination with a power control technique.

In contrast, if a wireless communication device, such as the first and second devices 120-1 and 120-j, is configured to operate with a fixed modulation coding scheme and without the benefit of power control, the quality of the signals received by the first and the second wireless communication devices, 120-1 and 120-j respectively, may vary based on their distance to the transmitting source, in this example the first base station 110-1.

As used herein, the term fixed modulation coding scheme refers to a modulation coding scheme that is constantly used for delivery of content, data, or information payload in the wireless signals. Although a separate modulation and coding scheme may be used for delivery of overhead data and control information, such modulation coding scheme is not considered in determining whether a signal uses a fixed modulation coding scheme. For example, if broadcast signals use a constant modulation coding scheme in delivering broadcast content data portion while different modulation coding schemes may be employed to transmit the overhead data, the modulation coding scheme for the broadcast content data portion is considered to be a fixed modulation coding scheme for the broadcast signals. In another embodiment, the modulation coding scheme for the signal is considered to be fixed when the modulation coding scheme is configured to be fixed for at least a duration of a communication session. For example, the modulation coding scheme may be fixed for all communications, or may be fixed for a particular user for the duration that the user is connected or otherwise engaged in a communication session.

An example of a signal having a fixed modulation coding scheme is a broadcast or multicast signal that can be configured to be transmitted by the first base station 110-1 to numerous wireless communication devices within the coverage area 116. Because a broadcast signal is not directed to any specific user, the first base station 110-1 may not permit feedback from a specific wireless communication device, whether the device 120-1 or 120-j, to modify or otherwise affect the modulation coding scheme or transmit power.

When the first base station 110-1 broadcasts a signal with a fixed modulation coding scheme and does not support feedback power control of the broadcast signal, the signal quality received by different wireless communication devices, such as the first and second devices 120-1 and 120-j, may vary based upon their respective distances to the transmitting source, the first base station 110-1. For example, with the same transmission power from the first base station 110-1, the first device 120-1 closer to the base station will typically receive better signal quality that the second device 120-j.

In addition, the first base station 110-1 needs to transmit the fixed modulation coding scheme signal at a transmit power sufficient to support communications to a worst case receiver, which typically encounters the largest signal attenuation, for example, through path loss. Typically, the worst case receiver is a receiver positioned at a boundary of the coverage area 116, such as the second wireless communication device 120-j as illustrated in FIG. 1. Compared with the second communication device 120-j, however, the first wireless communication device 120-1 that is positioned geographically closer to the first base station 110-1 may receive the signal using a fixed modulation coding scheme at a power level that far exceeds the power level needed to sustain a sufficient signal quality. As a result, the first wireless communication device 110-1 may be unnecessarily consuming resources if it is processing the fixed modulation coding scheme signal using an excess of multiple receivers or multiple receive signal paths. For example, the first wireless communication device 110-1 may be performing unnecessary redundant signal processing if it implements a diversity receiver, while a single receiver processing the fixed modulation coding scheme signal would produce sufficient signal quality. Therefore, the first wireless communication device 110-1 can selectively conserve power by powering down one or more of the multiple receivers, receiver portions, receive processing elements, or receive signal processing paths.

In one embodiment, at a high level, a process of determining whether the received signal quality permits one or more elements, signal processing paths, or receivers to be powered down or otherwise controlled to a reduced power state works as follows. On the one hand, a wireless communication device, such as the first wireless communication device 120-1, can, for example, generate or otherwise determine a signal metric value based on the received signals. The signal metric value can relate to or otherwise be indicative of a signal quality. The signal metric value can be, for example, a signal to noise ratio (SNR) value, a carrier and interference to noise ratio (CINR) value, a packet error rate (PER) value, frame error rate (FER) value, a Symbol Error Rate (SER) value, a Bit Error Rate (BER) value, received signal strength indication (RSSI) value, and the like or some other signal metric value or combination of signal metric values. On the other hand, the first wireless communication device 120-1 can determine the particular fixed modulation coding scheme used for the received signals and further, based in part upon the modulating coding scheme, retrieve or otherwise generate a signal metric type and a corresponding threshold value, which may be stored in a look-up table in a memory accessible to the device. In operation, the threshold can include, for example, a power-down threshold as well as a power-up threshold in order to introduce a level of hysteresis in the power-down and power-up decisions. Then the first wireless communication device 120-1 can compare the signal metric value against the threshold to determine whether one or more receivers or receiver portions can be de-energized or otherwise controlled to a low power configuration. As an example, the first wireless communication device 120-1 implementing a diversity receiver having two receivers can be configured to de-energize one of the two receivers in the diversity receiver when the signal metric value exceeds the power-down threshold. Similarly, the first wireless communication device 120-1 can be configured to energize a previously de-energized one of the two receivers in the diversity receiver when the signal metric value falls beneath the power-up threshold.

Additionally, a wireless communication device, such as the first wireless device 120-1, may also examine one or more operating states that constrain or otherwise affect the selective application of power reduction in the receivers. In an embodiment, the operating state of the first wireless device 120-1 may override any threshold-based power reduction decision. For example, the first wireless device 120-1 can determine or otherwise characterize its mobility state as one of low, medium, or high mobility. When the mobility state is a high mobility state, the first wireless device 120-1 may override a power reduction decision and prevent receivers from being de-energized. This is because a high mobility state typically correlates with high probability of changing channel conditions that may result in a fading condition, where at least a portion of the operating band experiences a deep signal fade so as to cause loss of information in the faded portion of the band. The first wireless device 120-1 may inhibit de-energizing of receivers during a high mobility state to reduce the possibility of a channel fade affecting the signal quality.

Following the above-described process, a wireless communication device, such as the first and second wireless devices 120-1 and 120-j, can thus selectively reduce its power consumption or selectively activate the diversity receiver with virtually no effect on the perceived signal quality. Therefore, the selective control over the receivers can be substantially unnoticeable to a user of the wireless device.

Figure 2:
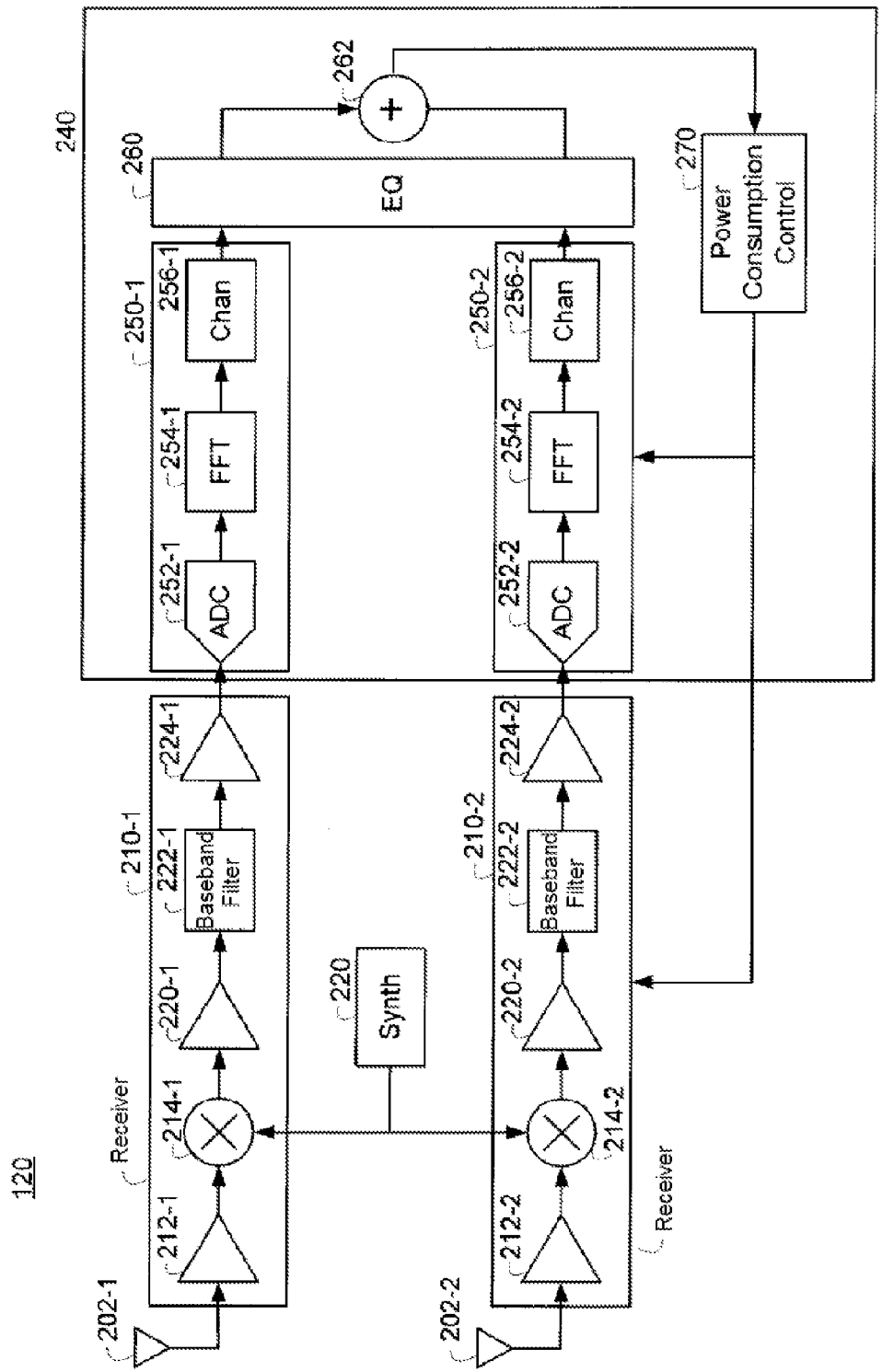
FIG. 2 is a simplified functional block diagram of an embodiment of a multiple receiver wireless communication device.

FIG. 2 is a simplified functional block diagram of an embodiment of a multiple receiver wireless communication device 120. The wireless communication device 120 can operate, for example, in the wireless communication system of FIG. 1, and can be the first or second wireless communication device shown in FIG. 1. The functional block diagram of FIG. 2 illustrates the receive portion of the wireless communication device 120. The wireless communication device 120 may also include a transmitter or ability to communicate to a base station, but the transmitter portion as well as user interfaces are omitted for the sake of clarity.

The wireless communication device 120 illustrated in FIG. 2 implements a diversity receiver having two receivers 210-1 and 210-2, both coupled to a baseband processing unit 240. In one embodiment, the wireless communication device 120 implements diversity combining in a baseband portion following digital signal processing of the received signals. However, a multiple receiver wireless device is not limited to only two receivers, nor is a diversity receiver limited to diversity combining in a baseband portion or following digital signal processing of the received signals.

The wireless communication device 120 embodiment illustrated in FIG. 2 is configured to process Orthogonal Frequency Division Multiplex (OFDM) or Orthogonal Frequency Division Multiple Access (OFDMA) symbols, and can be configured to receive one or more logical channels embodied in the OFDM symbols. The power control apparatus and methods described herein are not limited to application in an OFDM device and may be applicable in other wireless device types.

As shown in FIG. 2, the wireless communication device 120 includes a first antenna 202-1 coupled to the first receiver 210-1, as well as a second antenna 202-2 coupled to the second receiver 210-2. The wireless communication device 120 also includes a local oscillator (LO) 220 that can be configured to generate a signal to frequency convert a received signal in each of the first and second receivers 210-1 and 210-2 from an operating frequency to a baseband frequency or substantially a baseband frequency. In practice, the outputs of the first receiver 210-1 and second receiver 210-2 provide the first and second inputs respectively to the baseband processing unit 240.

The baseband processing unit 240 includes a first baseband processor 250-1 configured to process the signals from the first receiver 210-1. The baseband processing unit 240 also includes a second baseband processor 250-2 configured to process the signals from the second receiver 210-2. The outputs from the first and second baseband processors 250-1 and 250-2 provide combined inputs to an equalizer 260. The equalizer 260 can be configured, for example, to time align the processed signals from the first and second baseband processors 250-1 and 250-2 to permit coherent combining of the signals. The equalizer 260 is further coupled to a signal combiner 262 that is configured to combine the time aligned first and second processed signals from the equalizer 260 and generate an output of a received content signal. In operation, the output of the combiner 262 provides input to a power control module 270. The power control module 270 can be configured to determine a selective power control decision, i.e., whether portions or all of the second receiver 210-1 and the second baseband processor 250-2 can be de-energized. In one embodiment, the power control module 270 can be configured to selectively de-energize the entire second receiver 210-1 and second baseband processor 250-2 based on the signal metric value determined from the received signal. In another embodiment, the power control module 270 can be configured to selectively de-energize portions of one or both of the second receiver 210-2 and second baseband processor 250-2 based on the signal metric value of the received signal.

As illustrated in FIG. 2, each of the first and second receiver 210-1 and 210-2 can include multiple active devices that consume power during operation, and therefore, de-energizing some or all of the active devices in the second receiver 210-2 reduces the power consumed by the wireless device 120, thereby potentially extending the battery life and associated operating time.

Take the first receiver 210-1 for example. It can include a low noise amplifier (LNA) 212-1 that is configured to receive and amplify the signals from the first antenna 202-1. The amplified output from the LNA 212-1 provides a first input of a mixer 214-1, while the output from the LO 220 provides a second input of the mixer 214-1 to enable the mixer 214-1 to frequency convert the received signal in the operating band to substantially a baseband signal. The output of a baseband signal from the mixer 214-1 can be coupled to an amplifier 220-1 that outputs an amplified baseband signal that is coupled to a baseband filter 222-1. The baseband filter 222-1 can operate, for example, to eliminate or otherwise attenuate undesired mixer products and undesired out of band signals such as signals from adjacent channels or adjacent bands. As a result, the filtered baseband signal from the baseband filter 222-1 can be coupled to a buffer amplifier 224-1 that can be configured to further amplify the filtered baseband signal and generate the output for the first receiver 210-1, which becomes the first input of the baseband processing unit 240.

The second receiver 210-2 is typically configured to be virtually identical to the first receiver 210-1. The second receiver 210-2 includes a LNA 212-2 configured to receive an input of signals from the second antenna 202-2 and generate an output for a mixer 214-2. The mixer 214-2 receives a second input of a local oscillator signal from the LO 220 and can be configured to frequency convert the first input signal received at the second antenna 202-2 to substantially a baseband signal. The output of the mixer 214-2 is received and amplified by an amplifier 220-2 that provides an output of the amplified baseband signal to a baseband filter 222-2. The filtered baseband signal from the baseband filter 222-2 can be coupled to a buffer amplifier 224-2 that can be configured to generate the second input of the baseband processing unit 240.

The baseband processing unit 240 can be configured with substantially similar baseband processors, such as the first and second baseband processors 250-1 and 250-2, corresponding to each receiver in the diversity receiver. The first baseband processor 250-1 can include an analog to digital converter (ADC) 252-1 that is configured to convert the analog signals from the first receiver 210-1 to a digital representation. The ADC 252-1 can be further coupled to a transform module, such as a Fast Fourier Transform (FFT) engine 254-1. The FFT engine 254-1 can be configured, for example, to transform the input signal from the ADC 252-1 from its time domain representation into a frequency domain representation. Specifically, if the signal includes a frame comprised of multiple Orthogonal Frequency Division Multiplex (OFDM) symbols or Orthogonal Frequency Division Multiple Access (OFDMA) symbols or any other symbols in the time domain, the FFT engine 254-1 can be configured to transform the symbols to corresponding frequency domain subcarriers or subchannels.

Then the output from the FFT engine 254-1 can be coupled to a logical channel module 256-1. As used herein, a logical channel refers to a resource allocation within any communication signal. For example, in the context of OFDM or OFDMA frames composed of multiple symbols, a logical channel, or resources allocated to a logical channel, may consist of a subset of the subcarriers in the frequency domain and a predetermined duration, typically measured in symbols, in the time domain. The subset of subcarriers may be as few as one or may include all of the subcarriers in the frequency spectrum. Additionally, the subset of subcarriers within a logical channel may be fixed or may vary over time. For example, a logical channel may consist of four subcarriers, but the identity of the four subcarriers may vary over time according to, for example, a predetermined algorithm or a pseudorandom pattern. Thus, within a frame of multiple symbols, a particular subcarrier may be assigned to different logical channels at different times. The resources allocated to a particular logical channel in a frame received in the signals, in terms of subcarrier and symbol indices, can be communicated in an overhead message such as a map message.

The logical channel module 256-1 can be configured to identify a logical channel or resources allocated for the signal based upon, for example, a user input or an assignment from the wireless communication system. Based upon the logical channel, the logical channel module 256-1 can determine which subcarriers are associated with the logical channel for each particular symbol. Then the logical channel module 256-1 can extract the information from those subcarriers to generate an output of logical channel information as a first input of the equalizer 260.

The second baseband processor 250-2 can be substantially similar to the first baseband processor 250-1. An ADC 252-2 receives the output from the second receiver 210-2 and converts the signal to a digital representation. The output from the ADC 252-2 can be coupled to an FFT engine 254-2. The FFT engine 254-2 can be configured to convert the time domain samples of the input signal from the ADC 252-2 to a corresponding frequency domain representation. The output of the FFT engine 254-2 can be coupled to a logical channel module 256-2 that is typically configured to extract information, similar to the logical channel module 256-1 in the first baseband processor 250-1, and produce an output of extracted logical channel information as a second input of the equalizer 260.

The equalizer 260 can be configured to time align the logical channel information extracted by the first and second baseband processors 250-1 and 250-2, by delaying one of the signals. The equalizer 260 can include buffers that store the logical channel information received at the first and second inputs to the equalizer 260. The buffers can be used to delay the earlier arriving logical channel information in order to time align it with the later arriving logical channel information. The outputs of the equalizer 260 will, further through the combiner 262, be received by the power control module 270 which, based in part upon these outputs, ultimately makes a power control determination.

Figure 3:
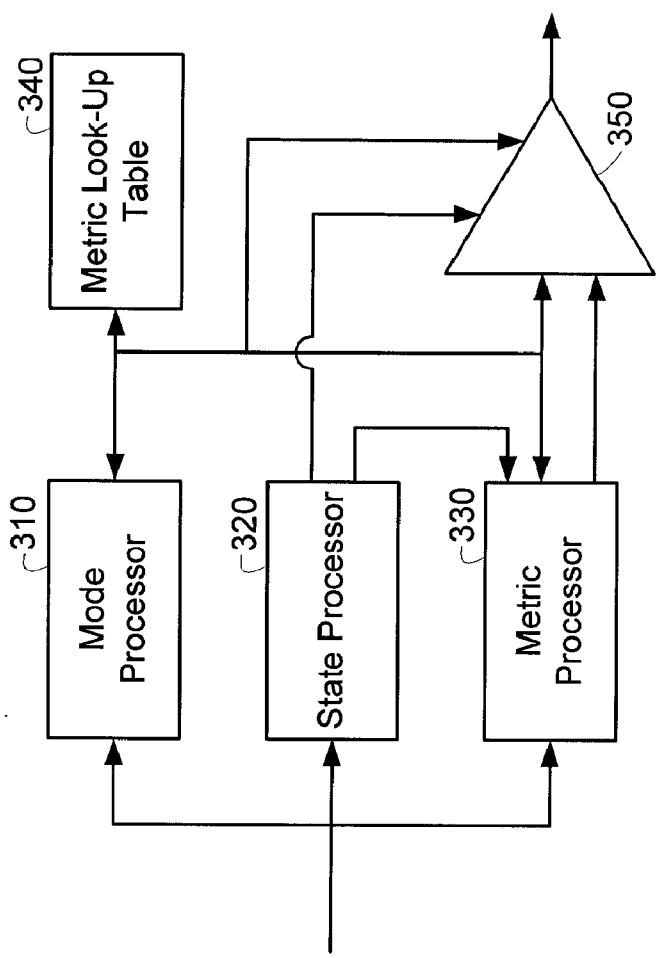
FIG. 3 is a simplified functional block diagram of an embodiment of a power control module.

FIG. 3 is a simplified functional block diagram of an embodiment of a power control module 270, such as the power control module in the wireless device of FIG. 2. The power control module 270 is configured to determine the power control decisions based in part on information derived from the received signals.

In FIG. 3, the power control module 270 is illustrated as including multiple distinct functional modules, such as a mode processor 310, a state processor 320, a metric processor 330, a metric look-up table 340 and a comparator 350. However, the functions of one or more of the modules may be partially or wholly combined, or the functions of a particular module may be performed by multiple modules. Additionally, the functions of one or more of the modules may be implemented as processor-readable medium comprising instructions that, when executed by a processor, can cause the processor to perform the functions of the respective module.

In one embodiment, the power control module 270 includes a mode processor 310 that can be configured to receive processed signals from other components of the wireless device as shown in FIG. 2. The mode processor 310 is further configured to, based upon the received signals, determine whether the device is engaged in an operating mode that supports dynamic modulation coding schemes or a fixed modulation coding scheme in the received signals. The mode processor 310 can be coupled to the received baseband signal following diversity combining, if any. The mode processor 310 can be configured to determine the engaged operating mode based on information in the received signals, information received from a user via a user interface, and the like, or some combination thereof.

The mode processor 310 can determine whether the operating mode utilizes a dynamic modulation coding scheme or a fixed modulation coding scheme. If the wireless device operates under an operating mode permitting dynamic modulation coding schemes, the mode processor 310 can be configured to disable or otherwise deactivate the ability to selectively power down receiver portions. For example, the mode processor 310 can be configured to selectively enable or disable a comparator 350 based on the mode information. Alternatively, if the mode processor 310 determines the device is engaged in an operating mode that supports a fixed modulation coding scheme, the mode processor can be further configured to determine the modulation coding scheme that is used in the received signals and further determine a type of signal metric that is used to make the power consumption control decision. The signal metric type can be, for example, a signal to noise ratio (SNR), a carrier and interference to noise ratio (CINR), a packet error rate (PER), frame error rate (FER), symbol error rate (SER), bit error rate (BER), received signal strength indication (RSSI), and the like or some other signal metric type or combination of signal metric types. In one embodiment, the mode processor 310 can retrieve a threshold or thresholds corresponding to the determined signal metric type from a metric look up table 340 that can be stored, for example, in one or more storage devices. Finally, the mode processor 310 is configured to communicate the identity of the signal metric type to the metric processor 330, in addition to communicating the one or more corresponding thresholds to the comparator 350.

In one embodiment, the metric look up table 340 can include at least one threshold for each supported signal metric type and modulation coding rate. Thus, if a particular signal metric type, e.g. SNR, is used for three different modulation coding rates, then the metric look up table can store at least three metric thresholds. The look up table 340 may store thresholds for different modulation coding schemes because different fixed modulation coding scheme information channels may utilize different modulation coding schemes, although for each information channel the modulation coding scheme can be fixed. The metric look up table 340 can also be configured to store a power down threshold as well as a power up threshold, where power down refers to activating power consumption conserving mode in which one or more portions of a receiver may be de-energized, and power up refers to deactivating power consumption conserving mode.

The metric processor 330 can be configured to receive a signal metric type from the mode processor 310 and determine a corresponding signal metric value from the received signals. The metric processor 330 can also be configured to communicate the signal metric value as a second input of the comparator 350. In one embodiment, the metric processor 330 can be configured to filter, smooth, or otherwise process the signal metric values in order to reduce noise contributions to the signal metric value. For example, the metric processor 330 can be configured to determine a signal metric value over a predetermined period, such as a symbol period or a frame period, but can be configured to output a signal metric value that is a moving average of multiple signal metric values.

With the first and second inputs from the mode processor 310 and metric processor 330 respectively, the comparator 350 can be configured to compare the signal metric value from the metric processor 330 against the one or more thresholds provided by the mode processor 310. The comparator 350 can be configured to activate one or more control lines that operate to selectively control the power supplied to one or more active elements within one or more receivers in the wireless device.

In one embodiment, the power control module 270 includes a state processor 320 that can be configured to determine an operating state of the wireless device based on the received signal. The presence of certain operating states can be used to modify or override the power consumption control decision that is determined based on the signal metric comparison. For example, if the state processor 320 determines that the device is operating in a handoff state, a mobility factor, a channel scanning state, a varying wireless channel state, and the like or some combination of states, there exists a higher probability of rapidly changing characteristics in the wireless communication channel between the base station and the wireless device that warrants continuing use of all receivers of a diversity receiver in processing signals. Thus, if any of those overriding states occurs, the state processor 320 can be configured to disable the comparator 350 or set the output of the comparator 350 to a predetermined state so as not to de-energize one or more receivers. As used herein, a handoff state may occur when the wireless device is engaged in a handoff, will imminently engage in a handoff, or has recently engaged in a handoff. A mobility factor can characterize a level of mobility or perceived level of mobility of the wireless device. A channel scanning state may indicate that the wireless device is scanning or tuning through multiple logical channels, such as in the instance where a user is scanning logical channel content for desired content. A varying wireless channel state can be determined, for example, by monitoring a signal metric value over time and determining that the signal metric value spans a range greater than a variation threshold within a given period of time. Such wide ranging signal metric value variation in a predetermined period of time can be an indicator of varying wireless channel conditions.

Figure 4:
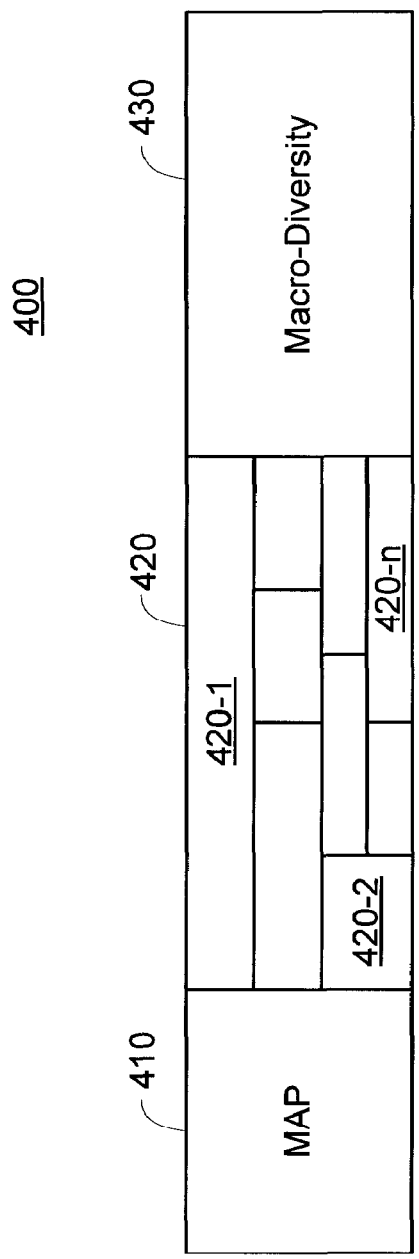
FIG. 4 is an illustration of an embodiment of a frame received in the wireless signals in a wireless communication system.

FIG. 4 is an illustration of an embodiment of a frame 400 that can be, for example, a downlink subframe transmitted from a base station to one or more wireless communication devices in a wireless communication system. The frame 400 can include one or more portions utilizing a fixed modulation coding scheme that permits a multiple receiver wireless device to selectively control power consumption.

In one embodiment, the frame 400 can represent a predetermined number of OFDM symbols transmitted by a base station. The horizontal axis can represent time, while the vertical axis can represent frequency or subcarrier allocation. The frame 400 can be, for example, a downlink subframe in a time division duplexed (TDD) system, in which each downlink subframe is followed by a corresponding uplink subframe. Because the power consumption control methods and apparatus described herein relate to power reduction in a receiver portion of a wireless device, the term "frame" typically refers to the downlink subframe of a TDD system. Of course, the techniques described herein are not limited to TDD systems, and are applicable to frequency division duplex systems, as well as other duplex systems.

The frame 400 can include a first portion 410, a portion including a MAP indicating allocations of resources allocated to logical channels in the present frame or a subsequent frame. The first portion 410 can include, for example, a downlink map portion and an uplink map portion, where each portion identifies the resource allocations for its respective link. The frame 400 can also include a second portion 420 that can include multiple resource allocations to multiple wireless devices. Typically, the resources allocated in the second portion 420 to the wireless devices can, for example, support dynamic modulation coding schemes but are not expressly limited to such an embodiment. The frame 400 can also include a third portion 430, a data portion containing macro-diversity data such as broadcast content or multimedia data streams, carried by one or more logical channels, with each logical channel utilizing a fixed modulation coding scheme.

The first portion 410 is typically positioned first or at least early in the frame 400 as shown in FIG. 4, but the positions of the second portion 420 and third portion 430 are not limited to the positions shown in FIG. 4. Instead, the positions of the second portion 420 and third portion 430 may be reversed, or the third portion 430 supporting the fixed modulation coding schemes may divide the second portion 420. In general, the second portion 420 and third portion 430 need not occur in a contiguous block within the frame 400.

The first portion 410 can include the resource allocations for the present frame 400 or a subsequent frame. In the latter case, a MAP portion of an earlier occurring frame may allocate the resources for the present frame 400 while the first portion 410 of the present frame 400 indicates resources allocated for a subsequent frame. Downlink resources allocated to support communications to particular wireless devices are typically allocated in the second portion 420.

The MAP within the first portion 410 typically utilizes a fixed modulation coding scheme. Typically the MAP in the first portion 410 is encoded using the most robust modulation coding scheme supported by the wireless communication system. Such a configuration may permit the MAP in the first portion 410 to be successfully recovered by a wireless device within the coverage area, regardless of the location of the wireless device within the coverage area. Thus, the MAP in the first portion 410 supports a fixed modulation coding scheme in addition to the logical channels within the third portion 430.

The downlink resources may be allocated to a single user or wireless device, and the size of the resource allocation may be based on the capacity of the wireless channel, the type of information to be conveyed, and the like, or some combination thereof. For example, the MAP 410 can include an allocation of first downlink resources 420-1 to support communications with a first wireless device and can include an allocation of second downlink resources 420-2 to support communications with a second wireless device. The first downlink resources 420-1 do not need to be of the same size as the second downlink resources 420-2. There may be any number of distinct resource allocations in the second portion 420. The second portion can include resources allocated to an nth communication link 420-*n*, where n represents the number of communication links for which resources are allocated in the second portion 420.

The MAP in the first portion 410 can also include information detailing the allocation of resources for the third portion, supporting the fixed modulation coding scheme communications. As an example, the fixed modulation coding scheme communications in the third portion 430 may be utilized to support one-to-many communications, such as multi-cast or broadcast from the base station to multiple wireless device.

The third portion 430 may support multiple logical channels, each having a fixed modulation coding scheme. However, each of the logical channels need not support the same fixed modulation coding scheme. The MAP within the first portion 410 can be configured to define the resources allocated to each of the logical channels in the third portion 430. Alternatively, the MAP within the first portion 410 may identify a secondary MAP within the third portion 430 that defines the resources for each logical channel in the third portion 430.

For example, the third portion 430 may be configured as a macro diversity region, in which multiple base stations transmit, for example, synchronized broadcast content. The synchronized broadcast content can be, for example, television programming or some other content that is typically broadcast to users over a large coverage area.

The MAP within the first portion 410 or secondary MAP within the third portion 430 can provide information relating to the modulation coding scheme used by each of the logical channels in the third portion 430. The MAP within the first portion 410 or secondary MAP can also identify a group of wireless devices to which multicast information is directed. The wireless device, for example, using the mode processor of FIG. 3, can determine the modulation coding scheme of the logical channels in the macro diversity region of the third portion 430 based on the information included in the MAP within the first portion 410 or a secondary MAP.

The modulation coding scheme of each logical channel in the third portion 430 may differ from the modulation coding scheme used to communicate the MAP 410 or secondary MAP information. A wireless device may need to modify its modulation coding scheme processing during the course of each frame in order to process the MAP 410 and logical channel within the third portion 430. However, each of the MAP 410 and logical channels in the third portion 430 is considered an information channel having a fixed modulation coding scheme. From the context of the wireless device, the information in the MAP 410 and each of the logical channels in the third portion 430 maintains a constant modulation coding scheme.

The wireless communication device receiving the frame 400 receives signals that are configured to support dynamic modulation coding schemes as well as signals supporting fixed modulation coding schemes. The wireless communication device can determine whether to perform power consumption control based on a signal selected or otherwise extracted from the frame 400. For example, if the wireless communication device determines from the MAP in the first portion 410 that a selected signal is allocated resources within the second portion 420, the wireless communication device can determine that the selected signal supports dynamic modulation coding schemes, and can inhibit power consumption control. Alternatively, if the wireless communication device determines that the selected signal is allocated resources in the third portion 430, such as when the wireless communication device is configured to receive broadcast signals from a macro diversity region, the wireless communication device can determine that the selected signal supports fixed modulation coding scheme. The wireless communication device can activate power consumption control when the selected signal supports a fixed modulation coding scheme.

Figure 5:
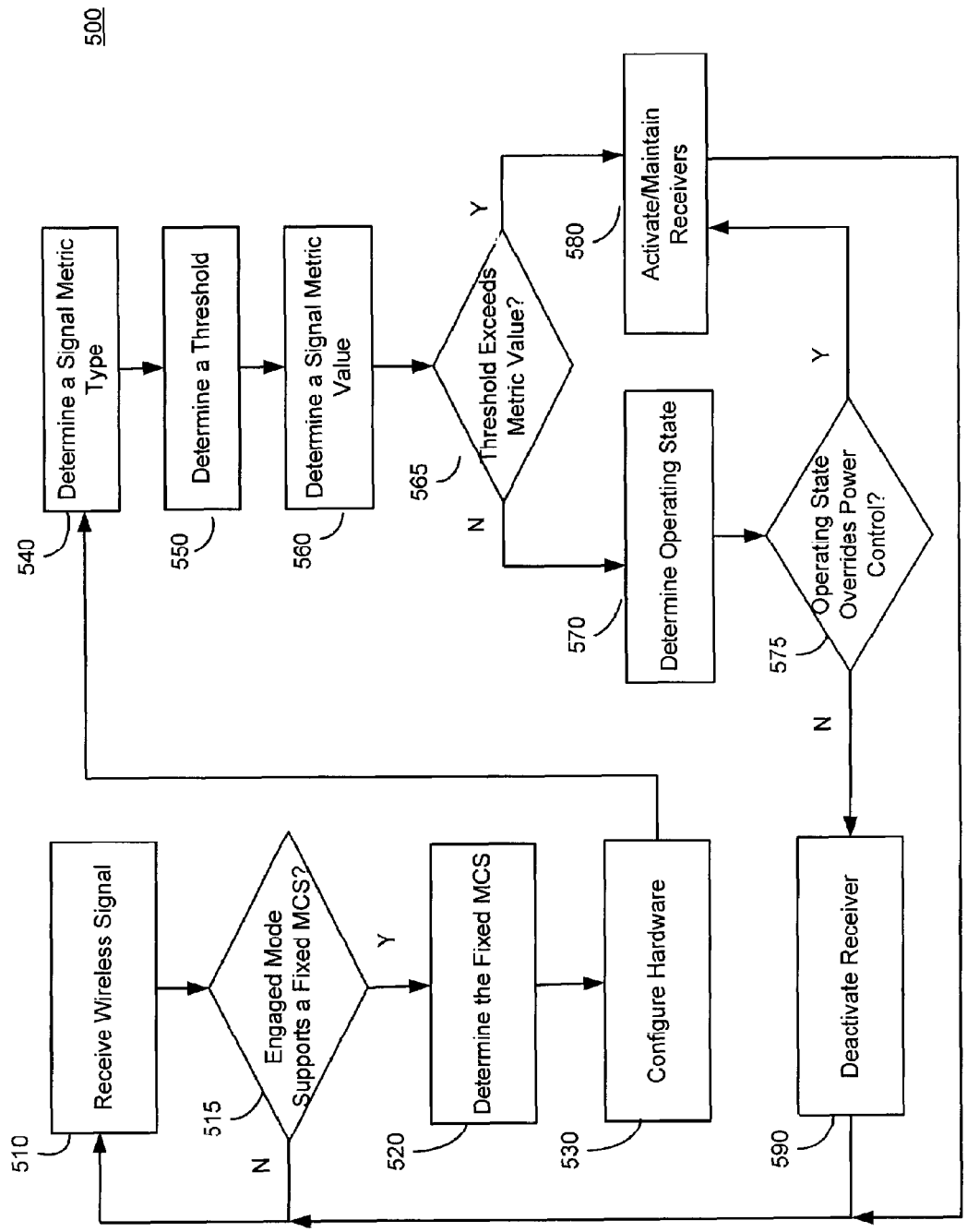
FIG. 5 is a simplified flowchart of an embodiment of a method of power consumption control in a multiple receiver wireless communication device.

FIG. 5 is a simplified flowchart of an embodiment of a method 500 of power consumption control in a multiple receiver wireless communication device. The method 500 can be executed, for example, by the wireless communication devices, 120-1 and 120-j, of FIG. 1 or by the multiple receiver wireless communication device 120 of FIG. 2.

The method 500 begins at block 510 where the multiple receiver wireless device receives wireless signals from a base station. The wireless signals can include, for example, a frame comprising OFDM symbols.

The wireless device proceeds to a decision block 515 where the wireless device determines whether it is engaged in an operating mode that supports a fixed modulation coding scheme or allows dynamically varying modulation coding schemes in the received signals. The wireless device can make the determination based on, for example, a user input or selection, information retrieved from a received wireless signal, or a combination thereof. As an example, the wireless device can receive a user selection of a broadcast channel, and receipt of broadcast channel can be an operating mode that supports a fixed modulation coding scheme for receiving broadcast signals. Alternatively, the wireless device may be directed, via a MAP message in a received wireless signal, to a particular portion of a frame that supports a fixed modulation coding scheme for a broadcast channel.

If the wireless device determines that it is engaged in a mode that only allows dynamically varying modulation coding schemes, for example, the device operating in a full duplex mode to communicate with various units in a wireless communication system, the power consumption control method and apparatus may not be applicable; otherwise, the wireless device proceeds to block 520 where the wireless communication device further determines a fixed modulation coding scheme for at least a portion of the received wireless signals. As an example the modulation coding scheme information can be determined based on the MAP information of a downlink subframe in the received wireless signals.

The wireless device proceeds to block 530 to re-configure the hardware in the wireless device for the fixed modulation coding scheme determined at block 520. As previously discussed, the wireless device may use a default modulation coding scheme for reception of overhead information, such as MAP information. The wireless device may need to reconfigure the hardware for the modulation coding scheme as determined at block 520 for receiving data coded with this modulation coding scheme over a logical channel that can be determined from the MAP message as discussed previously. The modulation coding scheme is considered to be fixed when, from the perspective of the wireless communication device, the content of a particular logical channel or information channel that is received at the device is transmitted using a constant modulation coding scheme. Although other information within the same frame of data, such as MAP information, may be transmitted by a separate modulation coding scheme, or even the base station may broadcast data over different logical channels to different wireless devices using different modulation coding schemes, they are not considered in determining whether a fixed modulation coding scheme exists for purposes of application of the power consumption control method and apparatus described herein.

After the hardware re-configuration, the wireless device, at block 540, determines a signal metric type based in part on the fixed modulation coding scheme. The wireless device can be configured, for example, to retrieve information identifying a particular signal metric type corresponding to a modulation coding scheme from a look up table in memory as discussed above. Alternatively, the wireless device can be configured to support a pre-determined signal metric type regardless of the modulation coding scheme of the received signal.

Then the method 500 proceeds to block 550 where the wireless device determines one or more thresholds based on the signal metric type. For example, the wireless device can be configured to retrieve one or more thresholds associated with the signal metric type from a look up table in memory as discussed above. The wireless device may retrieve a distinct threshold for energizing and de-energizing the receiver in order to implement hysteresis. In another embodiment, the wireless device may retrieve a threshold for de-energizing the receiver portions and determine a threshold for energizing the receiver based on the retrieved threshold. For example, the wireless device may retrieve a SNR threshold for de-energizing the receiver and may determine a threshold for re-energizing the receiver by subtracting a predetermined value, e.g. 3 dB, from the de-energizing threshold.

At block 560 the wireless communication device determines the signal metric value corresponding to the relevant signal metric type based on the received signal. Initially, the wireless device can be configured to utilize all of the multiple receivers capable of processing the received signal. However, once power consumption controls selectively de-energize or energize one or more receivers, the wireless device may utilize fewer than all receivers when determining the signal metric value. Additionally, the wireless device determines the signal metric value based on information received from a logical channel. For example, where a logical channel is configured to carry a macro-diversity data region, the wireless device may determine the signal metric value based on the macro-diversity region carried by the logical channel.

The wireless device is now prepared to make power consumption control decisions based on the previously determined parameters. At decision block 565 the wireless device compares the signal metric value with the one or more thresholds. For example, the wireless device can determine whether the threshold exceeds the signal metric value. If the threshold exceeds the signal metric value, the wireless device can proceed to block 580 to activate or otherwise energize any previously deactivated or de-energized receivers or receiver portions. The wireless device proceeds from block 580 back to block 510 to continue receiving and processing the wireless signals.

If, at decision block 565, the wireless device determines that the threshold does not exceed the signal metric value, the wireless device proceeds to block 570 to determine an operating state of the wireless device. Before de-energizing or otherwise deactivating the receiver or a portion of the receiver, the wireless device may perform an additional check on the operating state at block 575 to determine whether the device is in an operating state that may modify or override a power consumption control decision determined at decision block 565.

The wireless device proceeds to decision block 575 after determining the operating state at block 570. At decision block 575, the wireless device determines whether the operating state is one that overrides or otherwise inhibits the operation of power consumption control. The operating state that may override the power control decision can include, for example, a mobility factor state, a handoff state, a channel stability state, and the like, or some other state. If the wireless device determines, at decision block 575, that it is in an operating state that overrides the power control decision, the wireless device proceeds to block 580 to maintain, activate or otherwise energize any previously deactivated or de-energized receivers or receiver portions. The wireless device returns from block 580 to block 510 to continue receiving and processing the wireless signals. Otherwise, if the wireless device determines at decision block 575 that the operating state does not override or inhibit power consumption control, the wireless device proceeds to block 590 where it de-energizes or otherwise deactivates a receiver or portion of a receiver before going back to block 510 to continue processing the received signals.

Figure 6:
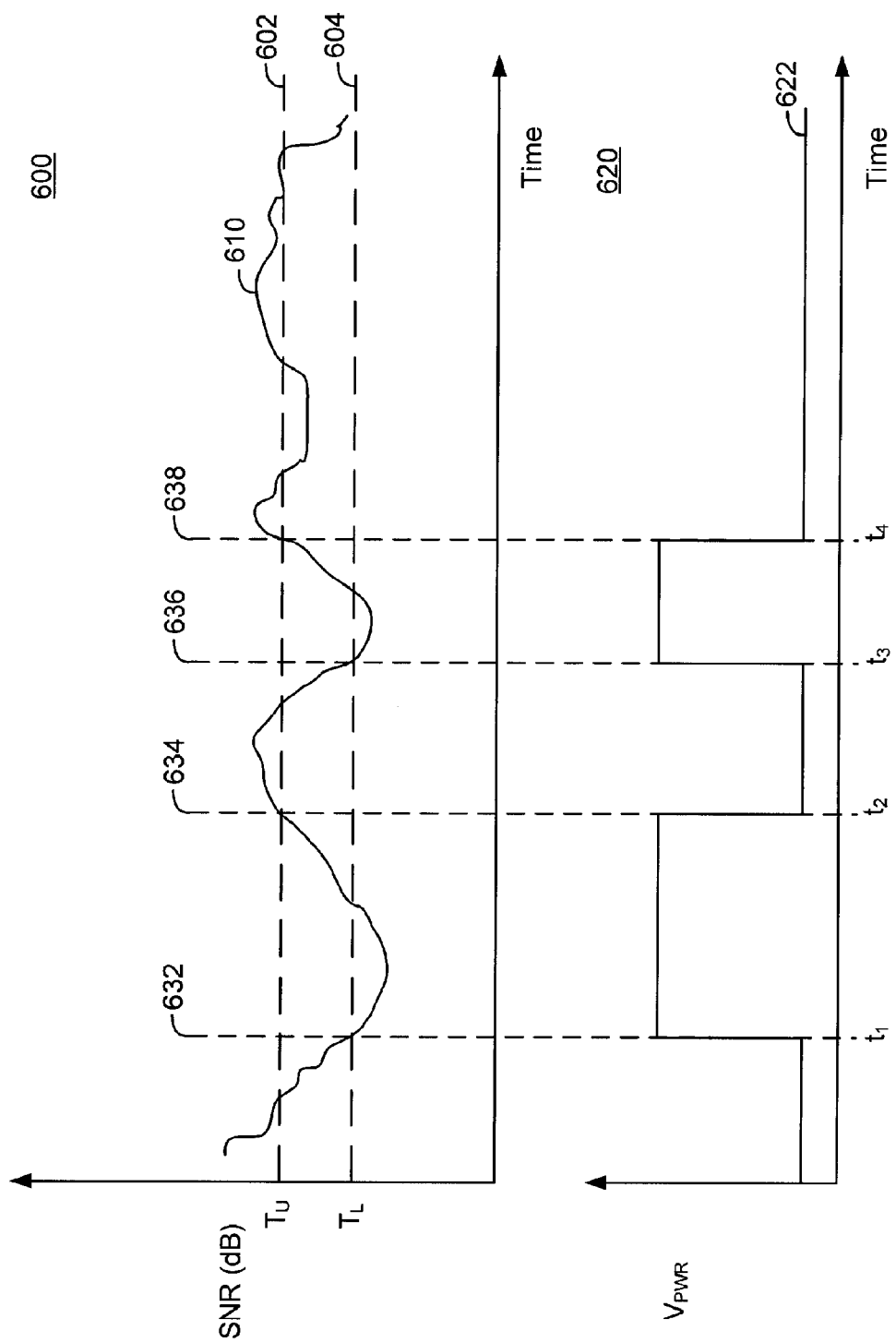
FIG. 6 is a simplified timing diagram of an example of a signal metric value and power consumption control signal.

FIG. 6 is a simplified timing diagram of an example of a signal metric value and power consumption control signal. The signal metric value timing diagram 600 depicts a signal metric value, here SNR, that can be determined from at least a portion of the received signal. An example of a signal metric value 610 plotted over time illustrates variations in the signal metric value that may occur due to various factors. The signal metric value timing diagram 600 also depicts two threshold values used in conjunction with the power consumption control decision. The use f two threshold values 602 and 604 enables the wireless device to implement hysteresis in the power consumption control decision. An upper threshold 602 can be used to determine when to enable or otherwise activate power reduction. A lower threshold 604 can be used to determine when to disable or otherwise deactivate power reduction.

A power consumption control timing diagram 604 depicts a power consumption control signal 622 over time and illustrates changes in the power consumption control states based on the signal metric values. The power consumption control signal 622 is depicted as having only two states. A high state can indicate an active state, such as where a receiver or receiver portion is active or otherwise energized. Conversely, a low state can indicate an inactive state, such as where a receiver or receiver portion id deactivated or de-energized.

In the example shown in FIG. 6, the signal metric value prior to time $t_1$ 632 may start at a level that is above the upper threshold 602. The corresponding power consumption control signal 622 is in the low state to indicate or otherwise control a receiver in a multiple receiver wireless device to a de-energized state. At time $t_1$ 632, the signal metric value 610 falls below the lower threshold 604. The power consumption control signal 622 transitions to the upper state to activate or energize the receiver.

At time $t_2$ 634, the signal metric value 610 again exceeds the upper threshold 602, and the power consumption control signal 622 drops to the low state to deactivate the receiver. Similarly, at time $t_3$ 636, the signal metric value 610 falls beneath the lower threshold 604 and the power consumption control signal 622 again transitions to the high, activated level. At time $t_4$ 638, the signal metric value 610 again exceeds the upper threshold 602, and the power consumption control signal 622 drops to the low state to deactivate the receiver. The use of the upper and lower thresholds 602 and 604 enable hysteresis, and reduce the effects that noise on the signal metric value has on the power consumption control decision.

The wireless communication device can be selectively configured to one or more operating modes that supports receiving signals having dynamic modulation coding schemes as well as one or more operating modes that support fixed modulation coding schemes. The wireless device can be configured to perform power consumption control when configured to process wireless signals in an operating mode that supports a fixed modulation coding scheme.

The wireless device can determine a signal metric type and associated thresholds based on the operating mode, modulation coding scheme, or some combination thereof. The wireless device can process received signals in a logical channel from a macro-diversity data region and determine a signal metric value therefrom. The wireless device can make power consumption control decision based on comparing the signal metric value against one or more thresholds.

The wireless device can be configured to selectively de-energize or deactivate one or more receivers, portions of receivers, or receiver signal paths in a multiple receiver device in order to conserve power and reduce power consumption.

As used herein, the term coupled or connected is used to mean an indirect coupling as well as a direct coupling or connection. Where two or more blocks, modules, devices, or apparatus are coupled, there may be one or more intervening blocks between the two coupled blocks.

The steps and modules of a method, process, apparatus or algorithm described in connection with the embodiments disclosed herein may be embodied directly in hardware, in software executed by a processor, or in a combination of the two. The various steps or acts in a method or process may be performed in the order shown, or may be performed in another order. Additionally, one or more process or method steps may be omitted or one or more process or method steps may be added to the methods and processes. An additional step, block, or action may be added in the beginning, end, or intervening existing elements of the methods and processes.

The above description of the disclosed embodiments is provided to enable any person of ordinary skill in the art to make or use the disclosure. Various modifications to these embodiments will be readily apparent to those of ordinary skill in the art, and the generic principles defined herein may be applied to other embodiments without departing from the scope of the disclosure.

What is claimed is:

1. A method of power reduction in a multiple receiver wireless communication device, the method comprising:
   receiving a wireless signal through multiple receivers of the wireless communication device, the wireless communication device dynamically reconfigurable to support any one of a plurality of modulation coding schemes;
   determining a fixed modulation coding scheme from at least a first fixed modulation coding scheme and a second fixed modulation coding scheme for at least a portion of the received wireless signal;
   selecting a signal metric type based on the determined fixed modulation coding scheme, wherein a first signal metric type is selected on a condition that the first fixed modulation coding scheme was determined, and a second signal metric type is selected on a condition that the second fixed modulation coding scheme was determined, wherein the selected signal metric type is from a group consisting essentially of a signal to noise ratio (SNR), a carrier and interference to noise ratio (CINR), a packet error rate (PER), a frame error rate (FER), a symbol error rate (SER), a bit error rate (BER), and a received signal strength indication (RSSI);
   measuring a signal metric value of the received wireless signal, wherein the signal metric value corresponds to the selected signal metric type; and
   selectively deactivating at least a portion of one of the multiple receivers based on the signal metric value.

2. The method of claim 1, further comprising:
   determining a threshold based on the determined fixed modulation coding scheme; and
   comparing the measured signal metric value to the threshold.

3. The method of claim 1, further comprising:
   determining an operating state of the wireless communication device, and
   wherein the selectively deactivating at least the portion of one of the multiple receivers is based on the operating state.

4. The method of claim 3, wherein the selectively deactivating at least the portion of one of the multiple receivers is inhibited when the operating state is any one of a handoff state, a channel scanning state and a high mobility factor state.

5. The method of claim 1, wherein an engaged operating mode utilizing the determined fixed modulation coding scheme comprises at least one of a receive-only mode, a broadcast mode, and a multicast mode.

6. The method of claim 1, wherein the signal metric value comprises at least one of a signal to noise ratio value, a carrier and interference to noise ratio value, a packet error rate value, and a received strength signal indication value.

7. The method of claim 1, wherein receiving the wireless signal comprises receiving a downlink allocation message identifying a macro diversity region and the determined fixed modulation coding scheme associated with the macro diversity region.

8. The method of claim 1, wherein the determining the fixed modulation coding scheme comprises:
   receiving a downlink map message in a downlink subframe in the wireless signal, wherein the downlink subframe comprises one or more Orthogonal Frequency Division Multiplex (OFDM) symbols; and
   determining the fixed modulation coding scheme based on the downlink map message.

9. The method of claim 1, wherein the determining the fixed modulation coding scheme comprises:
   determining that the wireless signal received at the wireless communication device includes a macro diversity region that uses the determined fixed modulation coding scheme.

10. The method of claim 1, wherein the measuring the signal metric value comprises:
    receiving a downlink map message in a downlink subframe of the wireless signal;
    determining a downlink resource allocation based on the downlink map message; and
    determining the signal metric value based on signals received in the downlink resource allocation.

11. A method of power reduction in a multiple receiver wireless communication device, the method comprising:
    receiving a wireless signal containing a downlink subframe, the downlink subframe comprising a downlink map utilizing a first modulation coding scheme;
    determining from the downlink map that the downlink subframe includes a macro diversity region utilizing a second modulation coding scheme, wherein the second modulation coding scheme is one of at least a first fixed modulation coding scheme and a second fixed modulation coding scheme;
    configuring the wireless communication device for the second modulation coding scheme;
    receiving the macro diversity region of the downlink subframe;
    selecting a signal metric type based on the second modulation coding scheme, wherein a first signal metric type is selected on a condition that the second modulation coding scheme is the first fixed modulation coding scheme, and a second signal metric type is selected on a condition that the second modulation coding scheme is the second fixed modulation coding scheme, wherein the selected signal metric type is from a group consisting essentially of a signal to noise ratio (SNR), a carrier and interference to noise ratio (CINR), a packet error rate (PER), a frame error rate (FER), a symbol error rate (SER), a bit error rate (BER), and a received signal strength indication (RSSI);
    measuring a signal metric value of the received wireless signal, wherein the signal metric value corresponds to the selected signal metric type; and
    selectively deactivating at least a portion of the multiple receiver wireless device based on the signal metric value.

12. The method of claim 11, wherein selectively deactivating at least the portion of the multiple receiver wireless device comprises:
   determining a threshold corresponding to the signal metric type;
   comparing the measured signal metric value and the threshold; and
   based on the comparison, de-energizing a portion of one receive signal processing path of the multiple receiver wireless device.

13. A method of power reduction in a multiple receiver wireless communication device, the method comprising:
   receiving a downlink subframe of Orthogonal Frequency Division Multiple Access (OFDMA) symbols;
   determining, from a downlink map portion of the downlink subframe using a first modulation coding scheme, a logical channel;
   configuring the multiple receiver wireless communication device for a second modulation coding scheme associated with the logical channel, wherein the second modulation coding scheme is one of at least a first fixed modulation coding scheme and a second fixed modulation coding scheme;
   receiving OFDMA symbols carrying the logical channel;
   selecting a signal metric type based on the second modulation coding scheme, wherein a first signal metric type is selected on a condition that the second modulation coding scheme is the first fixed modulation coding scheme, and a second signal metric type is selected on a condition that the second modulation coding scheme is the second fixed modulation coding scheme, wherein the selected signal metric type is from a group consisting essentially of a signal to noise ratio (SNR), a carrier and interference to noise ratio (CINR), a packet error rate (PER), a frame error rate (FER), a symbol error rate (SER), a bit error rate (BER), and a received signal strength indication (RSSI);
   measuring a signal metric value of the logical channel, wherein the signal metric value corresponds to the selected signal metric type; and
   selectively deactivating at least a portion of one of the multiple receivers based on the signal metric value.

14. The method of claim 13, further comprising:
   determining an operating state of the wireless communication device, and
   wherein the selectively deactivating at least the portion of one of the multiple receivers is based on the operating state.

15. The method of claim 13, wherein the logical channel supports a plurality of fixed modulation coding schemes.

16. The method of claim 13, wherein the logical channel comprises a portion of a macro diversity region of the received subframe of OFDMA symbols.

17. The method of claim 13, wherein the selectively deactivating at least the portion of one of the multiple receivers comprises de-energizing elements within a portion of a receive signal path.

18. A multiple receiver wireless communication device having power consumption control, the device comprising:
   a first receiver configured to receive a wireless signal having any of a plurality of modulation coding schemes;
   a second receiver configured to receive the wireless signal; and
   a power consumption control module configured to:
      determine a fixed modulation coding scheme from at least a first fixed modulation coding scheme and a second fixed modulation coding scheme of an engaged operating mode;
      select a signal metric type and associated threshold based on the determined fixed modulation coding scheme, wherein a first signal metric type is selected on a condition that the first fixed modulation coding scheme was determined, and a second signal metric type is selected on a condition that the second fixed modulation coding scheme was determined, wherein the selected signal metric type is from a group consisting essentially of a signal to noise ratio (SNR), a carrier and interference to noise ratio (CINR), a packet error rate (PER), a frame error rate (FER), a symbol error rate (SER), a bit error rate (BER), and a received signal strength indication (RSSI);
      measure a signal metric value of the received wireless signal, wherein the signal metric value corresponds to the selected signal metric type; and
      selectively deactivate the second receiver based on the measured signal metric value.

19. The device of claim 18, wherein the power consumption control module comprises:
   a comparator having first and second differential inputs coupled to the measured signal metric value and to the threshold, respectively.

20. The device of claim 19, further comprising a metric look-up table, and wherein a mode processor is configured to determine the signal metric type and threshold from the metric look-up table.

21. The device of claim 19, wherein the comparator is further configured to selectively de-energize the second receiver based on a comparison result of the signal metric value and the threshold.

22. The device of claim 18, wherein the power consumption control module is further configured to:
   determine an operating state of the device; and selectively deactivate the second receiver based on the determined operating state.

23. The device of claim 18, wherein the wireless signal comprises a plurality of Orthogonal Frequency division Multiplex (OFDM) symbols carrying a plurality of logical channels, and wherein the power consumption control module is configured to determine the signal metric value based on a particular logical channel from the plurality of logical channels.

24. A multiple receiver wireless communication device having power consumption control, the device comprising:
   a first receiver configured to receive a wireless signal containing a downlink subframe, the downlink subframe comprising a downlink map utilizing a first modulation coding scheme;
   a second receiver configured to receive the wireless signal;
   at least one baseband processor coupled to the first and second receivers and configured to process the wireless signal;
   a mode processor configured to determine from the downlink map that the downlink subframe includes a macro diversity region utilizing a distinct second modulation coding scheme and to reconfigure the wireless communication device for the second modulation coding scheme, wherein the second modulation coding scheme is one of at least a first fixed modulation coding scheme and a second fixed modulation coding scheme;
   a metric processor configured to select a signal metric type and an associated threshold based on the second modulation coding scheme, and to measure a signal metric value of the received wireless signal, wherein the signal metric value corresponds to the signal metric type, and wherein a first signal metric type is selected on a condition that the second modulation coding scheme is the first fixed modulation coding scheme, and a second signal metric type is selected on a condition that the second modulation coding scheme is the second fixed modulation coding scheme, wherein the selected signal metric type is from a group consisting essentially of a signal to noise ratio (SNR), a carrier and interference to noise ratio (CINR), a packet error rate (PER), a frame error rate (FER), a symbol error rate (SER), a bit error rate (BER), and a received signal strength indication (RSSI); and a comparator having first and second differential inputs connected to the measured signal metric value and to the threshold, respectively, an output connected to at least one of the first receiver, the second receiver and the at least one baseband processor of the multiple receiver wireless device, and configured to selectively deactivate at least a portion of the multiple receiver wireless device based on the signal metric value.

25. A non-transitory processor-readable medium associated with a wireless communication device, which includes multiple receivers, comprising instructions, which, when executed by a processor, cause the processor to perform operations, the instructions comprising:

instructions for determining a fixed modulation coding scheme from at least a first fixed modulation coding scheme and a second fixed modulation coding scheme of a wireless signal, wherein the wireless communication device can be dynamically reconfigured to support any one of a plurality of modulation coding schemes;

instructions for selecting a signal metric type based on the determined fixed modulation coding scheme, wherein a first signal metric type is selected on a condition that the first fixed modulation coding scheme was determined, and a second signal metric type is selected on a condition that the second fixed modulation coding scheme was determined, wherein the selected signal metric type is from a group consisting essentially of a signal to noise ratio (SNR), a carrier and interference to noise ratio (CINR), a packet error rate (PER), a frame error rate (FER), a symbol error rate (SER), a bit error rate (BER), and a received signal strength indication (RSSI);

instructions for measuring a signal metric value of a portion of the wireless signal, wherein the signal metric value corresponds to the selected signal metric type; and instructions for selectively deactivating at least a portion of one of the multiple receivers based on the signal metric value.

26. A power consumption control module configured to determine whether a host device is engaged in an operating mode supporting a fixed modulation coding scheme, the power consumption control module comprising:

a mode processor configured to determine the fixed modulation coding scheme from at least a first fixed modulation coding scheme and a second fixed modulation coding scheme of a wireless signal and select a signal metric type and associated threshold based on the determined fixed modulation coding scheme, wherein a first signal metric type is selected on a condition that the first fixed modulation coding scheme was determined, and a second signal metric type is selected on a condition that the second fixed modulation coding scheme was determined, wherein the selected signal metric type is from a group consisting essentially of a signal to noise ratio (SNR), a carrier and interference to noise ratio (CINR), a packet error rate (PER), a frame error rate (FER), a symbol error rate (SER), a bit error rate (BER), and a received signal strength indication (RSSI);

a metric processor configured to measure a signal metric value of the wireless signal, wherein the signal metric value corresponds to the selected signal metric type; and a comparator having first and second differential inputs connected to the mode processor and metric processor, respectively, an output connected to at least a portion of at least one of a receiver or a baseband processor of the host device, the comparator configured to selectively deactivate at least a portion of the host device based on the signal metric value.

\* \* \* \* \*